United States Patent [19]

Miyauchi et al.

[11] Patent Number: 4,762,873

[45] Date of Patent: Aug. 9, 1988

[54] POLYCARBONATE RESIN COMPOSITION

[75] Inventors: Masayoshi Miyauchi; Osamu Ohara, both of Matsuyama, Japan

[73] Assignee: Teijin Chemicals, Ltd., Tokyo, Japan

[21] Appl. No.: 873,782

[22] Filed: Jun. 12, 1986

[30] Foreign Application Priority Data

Jun. 14, 1985 [JP]  Japan ............... 60-128228

[51] Int. Cl.$^4$ ............... C08K 5/10; C08K 5/51; C08K 5/52
[52] U.S. Cl. ............... 524/128; 524/145; 524/147; 524/151; 524/153; 524/317
[58] Field of Search ............... 524/128, 145, 151, 152, 524/153, 317, 147, 78

[56] References Cited

U.S. PATENT DOCUMENTS

| | | | |
|---|---|---|---|
| 3,404,122 | 10/1968 | Fritz et al. | 524/127 |
| 3,953,539 | 4/1976 | Kawase et al. | 524/145 |
| 3,965,064 | 6/1976 | Mercier et al. | 524/145 |
| 4,363,891 | 12/1982 | Rosen et al. | 524/317 |
| 4,421,886 | 12/1983 | Worschech et al. | 524/317 |
| 4,514,357 | 4/1985 | Kawaguchi et al. | 524/611 |

FOREIGN PATENT DOCUMENTS

| | | | |
|---|---|---|---|
| 111959 | 10/1974 | Japan | 524/317 |
| 84333 | 6/1980 | Japan | 524/317 |
| 86837 | 7/1980 | Japan | 524/317 |
| 6081245 | 5/1985 | Japan | 524/317 |
| 713355 | 8/1954 | United Kingdom | 524/317 |
| 1516064 | 6/1978 | United Kingdom | 524/317 |

*Primary Examiner*—John Kight
*Assistant Examiner*—Kriellion S. Morgan
*Attorney, Agent, or Firm*—Sherman and Shalloway

[57] ABSTRACT

A polycarbonate resin composition comprising a blended mixture of (A) 100 parts by weight of a polycarbonate resin having a viscosity average molecular weight of from about 13,000 to about 18,000, (B) 0.01 to 0.1 part by weight of a partial ester of a monobasic fatty acid having 10 to 22 carbon atoms with a polyhydric alcohol having 2 to 10 carbon atoms, (C) 0.001 to 0.01 part by weight of trimethyl phosphate, and (D) 0.00001 to 0.002 part by weight, calculated as phosphorus atoms, of a phosphite ester having 9 to 60 carbon atoms.

7 Claims, No Drawings

POLYCARBONATE RESIN COMPOSITION

This invention relates to a polycarbonate resin composition, and specifically, to a polycarbonate resin composition having various excellent properties such as excellent flowability, thermal stability, moldability and hydrolysis resistance and pinhole formation resistance on a thin coated layer on the surface of a molded article prepared from the resin composition. The polycarbonate resin composition of this invention is useful in many applications, especially in optical applications.

More specifically, this invention relates to a polycarbonate resin composition comprising a blended mixture of (A) 100 parts by weight of a polycarbonate resin having a viscosity average molecular weight of from about 13,000 to about 18,000, (B) 0.01 to 0.1 part by weight of a partial ester of a monobasic fatty acid having 10 to 22 carbon atoms with a polyhydric alcohol having 2 to 10 carbon atoms, (C) 0.001 to 0.01 part by weight of trimethyl phosphate and (D) 0.00001 to 0.002 part by weight, calculated as phosphorus atoms, of a phosphite ester having 9 to 60 carbon atoms.

Polycarbonate resins have been used in a wide range of applications, and recently attracted attention as resins which give substrates for information recording articles such as digital signal recording discs, optical articles such as lenses, prisms and Fresnel lenses and excellent molded articles for use in other optical applications.

In such optical uses, one important property required of the polycarbonate resin is that a molded article of the polycarbonate resin has a reduced optical distortion (retardation). Generally, such a resin article is essentially required to have a birefringence of not more than 100 nm. To obtain such low-birefringence molded articles, it is the usual practice to use a polycarbonate resin having a viscosity average molecular weight of not more than about 20,000. Since the molding temperature for such a polycarbonate resin reaches about 300° to about 400° C., it is desired to use a polycarbonate resin composition having high thermal stability and excellent mold releasability.

In optical applications, for example as a substrate for information recording devices, it is frequently the practice to provide a thin coated layer of a metal or a metal compound or a thin coated layer containing a dye on the surface of the substrate. Furthermore, in using the polycarbonate resin as a lens, a thin coated layer of a metal, a metal compound, an organosiloxane-type paint or a melamine-type paint is frequently applied to the lens surface for prevention of scratching, or for antihaze and antiglare purposes. In such optical applications, it is desired to use a polycarbonate resin composition having excellent hydrolysis resistance, excellent resistance to pinhole formation on the thin coated layer, and therefore a satisfactory life or durability.

It is extremely difficult, however, to provide a polycarbonate resin composition having excellent properties that meet the aforesaid various requirements, and it has been desired to develop such a composition.

Japanese Patent Publication No. 41092/1972 (published on Oct. 17, 1972), for example, discloses a polycarbonate resin composition comprising a polycarbonate resin and as a lubricant for improving the releasability of a molded product from a mold, 0.05 to 5% by weight, preferably 0.1 to 0.5% by weight, of an ester or partial ester of a monobasic saturated aliphatic carboxylic acid having 12 to 30 carbon atoms with a monohydric saturated aliphatic alcohol or a polyhydric alcohol. The lubricant in this patent document includes partial esters which can overlap component (B) of the composition of the present invention. This patent document, however, neither describes nor suggests a composition comprising a combination of essential components (A) to (D) in the present invention. It quite fails to describe the utilization of the polycarbonate resin composition in optical applications, the technical problems in such applications and an idea of solving such problems. Furthermore, this patent document illustrates only the use of polycarbonate resins having a molecular weight exceeding about 20,000, for example 24,000 and 25,000.

Japanese Laid-Open Patent Publication No. 81245/1985 (laid open on May 9, 1985) discloses a polycarbonate resin composition comprising a polycarbonate resin having a viscosity average molecular weight of 15,000 to 35,000 and containing 15 to 150 ppm, calculated as chlorine atoms, of a chlorine compound such as methylene chloride and 0.001 to 0.5% by weight, preferably 0.03 to 0.1% by weight, of a partial ester, preferably a monoester, of a monobasic saturated aliphatic carboxylic acid having preferably 10 to 24, more preferably 12 to 20, carbon atoms, with a polyhydric alcohol in order to prevent the corrosion of a mold which adversely affect the appearance of a molded article prepared from it, the releasability of the molded aricle from the mold, the dimensional accuracy of the molded article, and the life of the mold, etc. The partial ester in this patent document can overlap the component (B) in the composition of this invention. However, this patent document totally fails to describe or suggest a composition comprising a combination of essential components (A) to (D) in the present invention. Furthermore, it does not touch upon the utilization of the composition in optical applications, the technical problems in such utility, and an idea of solving these problems.

Japanese Laid-Open Patent Publication No. 50348/1977 (laid open on April 22, 1977) discloses the stabilization of a molten polycarbonate resin against discoloration by chlorine. Specifically, this patent document describes a process for producing a polycarbonate resin molded article having improved color, which comprises mixing 100 parts by weight of a polycarbonate resin containing 0.005 to 0.2% by weight of chlorine with 0.005 to 0.1 part by weight of a methyl phosphate ester, preferably trimethyl phosphate, and melt-molding the mixture. Trimethyl phosphate in this patent document corresponds to component (C) of the composition of the present invention. However, this patent document neither describes nor suggests a composition comprising a combination of essential components (A) to (D) in the present invention. The patent document totally fails to disclose the utilization of the composition in optical applications, the technical problems in such utility, and guidelines for solving the problems.

Japanese Laid-Open Patent Publication No. 126119/1983 (laid open on July 27, 1983) describes a process for producing a polycarbonate resin molded article having excellent optical properties, particularly high transparency and reduced optical distortion. According to this process, a polycarbonate resin derived from a bis(hydroxyphenyl)alkane having an average molecular weight of 12,000 to 18,000 containing 0.005 to 0.5% by weight, preferably 0.01 to 0.2% by weight, of a phosphite ester of the following formula

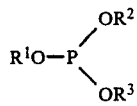

wherein $R^1$ and $R^2$ each represent an alkyl or aryl group, and $R^3$ represents a hydrogen atom or an alkyl or aryl group, is injection-molded at a resin temperature of 330 to 400° C. and a mold temperature of 50° to 110° C. The phosphite ester in this patent document can overlap component (D) in the composition of the present invention. However, this patent document also fails to describe or suggest a composition comprising a combination of essential components (A) to (D) in the present invention. It is directed to the improvement of transparency and optical distortion, but the patent document quite fails to touch upon an idea of simultaneously solving the technical problems of hydrolysis resistance and pinhole formation resistance described hereinabove.

Japanese Laid-Open Patent Publication No. 180553/1983 (laid open on October 22, 1983) proposes a polycarbonate resin molding material for use in making optical devices and appliances. It specifically discloses that the occurrence of burn marks or decomposition and degeneration of a polycarbonate resin having a viscosity average molecular weight of from 15,000 to 18,000 during molding at high temperatures can be inhibited by incorporating 100 to 300 ppm, preferably 150 to 200 ppm, of an antioxidant in the polycarbonate resin. This patent document gives tris(nonylphenyl)-phosphite, 2-hexylbenzylphenyl phosphite and triphenyl phosphite as examples of the antioxidant. The above-illustrated antioxidants in this patent document can overlap component (D) of the composition of the present invention. However, it also fails to describe or suggest a composition comprising a combination of essential components (A) to (D) in the present invention. The invention disclosed in this patent document is directed to the prevention of the occurrence of burn marks and decomposition and degradation having regard to optical applications, but the patent document neither describes nor suggest guidelines for simultaneously solving the technical problems of hydrolysis resistance and pinhole formation resistance stated hereinabove.

Polycarbonate resins tend to be more susceptible to degradation than other resins because of their relatively high temperatures used in injection molding or extrusion. This tendency leads to a decrease in molecular weight or to coloration due to thermal degradation. In an attempt to overcome such troubles, Japanese Laid-Open Patent Publication No. 111959/1974 (laid open on October 24, 1974) proposes a polycarbonate resin composition comprising a polycarbonate resin, a component which can overlap component (B) of the composition of this invention and a component which can overlap component (D) of the composition of this invention. This patent document states that the use of the component corresponding to component (B) alone produces only a small effect of imparting thermal stability and the use of the component corresponding to component (D) alone in an amount sufficient to impart thermal stability results in the occurrence of foams or silver streaks in a molded article prepared from the resin composition. It specifically proposes a thermally stable polycarbonate resin composition which can embrace a composition comprising a polycarbonate resin, 0.01 to 2% by weight of a glycerin ester of a monobasic saturated aliphatic carboxylic acid having 10 to 30 carbon atoms and 0.001 to 0.1% by weight, calculated as phosphorus atoms, of phosphorous acid or a phosphite ester. However, this patent document neither describes nor suggests a composition comprising a combination of essential components (A) to (D) in the present invention which corresponds to the composition proposed in this prior patent document plus the component (C) in the composition of the present invention. Furthermore, this patent document totally fails to disclose the utilization of the composition in optical applications, the technical problems in such utility and guidelines for solving the problems. It is also silent on an idea of solving the technical problems of hydrolysis resistance and pinhole formation resistance stated hereinabove, and only illustrates the use of polycarbonate resin having a viscosity average molecular weight in the range of 25,000 to 29,400 which quite falls outside the range of not more than about 20,000.

The present inventors have made investigations in order to provide a polycarbonate resin composition having a combination of excellent properties, and particularly a polycarbonate resin composition in which the polycarbonate resin has a viscosity average molecular weight of from about 13,000 to about 18,000, and which can give a molded article having excellent quality.

These investigations have led to the discovery that a polycarbonate resin composition comprising essential components (A) to (D) has properties required of optical applications including flowability, thermal stability, moldability, hydrolysis resistance and pinhole formation resistance.

Investigations of the present inventors have shown that by incorporating the following components (B), (C) and (D) in the above specified amounts into a polycarbonate resin component (A) having a viscosity average molecular weight of from about 13,000 to about 18,000, a polycarbonate resin composition of high quality having the various excellent properties described above can be obtained.

Component (B)

This component can overlap the components which when used alone, are useful for inhibiting the corrosion of a mold that exerts adverse effects on the releasability of a polycarbonate resin molded article from the mold, the appearance of the molded article, etc. (for example, the above-cited Japanese Laid-Open Patent Publication No. 81245/1985), and which the above-cited Japanese Laid-Open Patent Publication points out, produce only a small effect of imparting thermal stability when used alone.

Component (C)

This component includes trimethyl phosphate known to be utilized alone for the inhibition of discoloration of a molten polycarbonate resin by chlorine (the above cited Japanese Laid-Open Patent Publication No. 50348/1977).

Component (D)

This component can overlap the phosphite ester which singly is useful for increasing the thermal stability of a polycarbonate resin and imparting oxidation resistance to it in optical applications (the above-cited Japanese Laid-Open Patent Publications Nos. 126119/1983 and 180553/1983) and which, the above-cited Japanese Laid-Open Patent Publication points out, cause foaming or the occurrence of silver streaks in molded articles of the polycarbonate when used singly in amounts useful for increasing thermal stability.

Investigations of the present inventors have shown that the aforesaid component (D) singly may cause troubles of hydrolysis or pinhole formation when used in smaller amounts, but when it is used in combination with the component (C) in accordance with this invention, it can, in reduced amounts, effectively increase the thermal stability of the polycarbonate resin composition in which the polycarbonate resin has a viscosity average molecular weight of about 13,000 to about 18,000, and also can effectively avoid the troubles of hydrolysis and pinhole formation as a result of using it in the presence of component (B).

It is an object of this invention therefore to provide a polycarbonate resin composition having various improved properties which is especially useful in optical applications.

The above and other objects of this invention along with its advantages will become apparent from the following description.

The polycarbonate resin (A) in the composition of this invention and the method of its production are known. Commercially available polycarbonate resins can also be used in this invention.

The polycarbonate resin component (A) may be produced by techniques known per se by reacting dihydric phenols with carbonate-precursors such as phosgene and diphenyl carbonate. Examples of the dihydric phenols are hydroquinone, dihydroxydiphenyl, bis(hydroxyphenyl)alkanes, bis(hydroxyphenyl)cycloalkanes, bis(hydroxyphenyl)ethers, bis(hydroxyphenyl)ketones, bis(hydroxyphenyl)sulfides, bis(hydroxyphenyl)sulfones and halogenated or lower alkylated products thereof. A polycarbonate resin derived from a bis(hydroxyphenyl)alkane and a carbonate precursor is preferred. The bis(hydroxyphenyl)alkane may, for example, be at least one member selected from the group consisting of 2,2-bis(4-hydroxyphenyl)-propane (bisphenol A), 1,1-bis(4-hydroxyphenyl)ethane and 2,2-bis(4-hydroxyphenyl)hexafluoropropane. The dihydric phenols may be used singly or in combination. Polycarbonate resins obtained by copolymerizing a small amount of an aromatic dicarboxylic acid further as a comonomer, and polycarbonate resins having a branched structure can also be used. The polycarbonates may be used singly or in combination.

In the present invention, the polycarbonate resin (A) has a viscosity average molecular weight ($\overline{M}$) of from about 13,000 to about 18,000. If the molecular weight ($\overline{M}$) is lower than the lower limit specified, the strength of a molded article from the polycarbonate resin is unsatisfactory for practical applications. If it is higher than the specified upper limit, molding strains tend to occur during molding, and the molded articles become unsuitable for optical applications. Accordingly, in the present invention, the polycarbonate resin (A) used has a viscosity average molecular weight ($\overline{M}$) of from about 13,000 to about 18,000.

The molecular weight ($\overline{M}$) of the polycarbonate in this invention is calculated in accordance with the following equation from the intrinsic viscosity $[\eta]$ (dl/g) of the polycarbonate resin determined at 20° C. for a methylene chloride solution of the resin.

$$[\eta] = 1.23 \times 10^{-4} \overline{M}^{0.83}$$

The partial fatty acid ester (B) used in the composition of this invention is a partial ester of a monobasic fatty acid having 10 to 22 carbon atoms with a polyhydric alcohol having 2 to 10 carbon atoms. The partial ester can be produced by esterifying the monobasic fatty acid with the polyhydric alcohol by techniques known per se, and is also available commercially. Such commercially available partial esters can also be used in this invention. The partial esters may be used singly or in combination, and are also available in such forms on the market.

Examples of the partial fatty acid ester (B) are partial esters formed between at least one monobasic fatty acid having 10 to 22 carbon atoms selected from the group consisting of myristic acid, palmitic acid, stearic acid, oleic acid and fatty acids of hardened fish oils and at least one polyhydric alcohol having 2 to 10 carbon atoms selected from the group consisting of ethylene glycol, glycerin and pentaerythritol. Preferred among these partial esters are those formed between glycerol and at least one fatty acid having 18 to 22 carbon atoms such as stearic acid, oleic acid and fatty acids (e.g., $C_{18}$–$C^{22}$) of hardened fish oils.

Trimethyl phosphate, are used as the component (C) of the polycarbonate resin composition of this invention.

The component (D) used in the polycarbonate resin composition of this invention is a phosphite ester having 9 to 60 carbon atoms. It is as mono-, di- or tri-ester. The tri-ester and a mixture of a major amount of the tri-ester with a minor amount of the mono- and/or di-ester are preferably used. Examples of the triester include tributyl phosphite, tris(2-ethylhexyl) phosphite, tridecyl phosphite, tristearyl phosphite, triphenyl phosphite, tricresyl phosphite, tris(nonylphenyl) phosphite, 2-ethylhexyl diphenyl phosphite, phenyl di-2-ethylhexyl phosphite, phenyl didecyl phosphite, tricyclohexyl phosphite, distearyl pentaerythrityl diphosphite, diphenyl pentaerythrityl diphosphite, didecyl diphenyl phosphite, and tris(2,4-di-t-butylphenyl) phosphite. These phosphite esters as component (D) may be used singly or in combination. Among them, preferred are triphenyl phosphite, tris(nonylphenyl) phosphite, 2-ethylhexyl diphenyl phosphite and tris(2,4-ditert.butylphenyl) phosphite.

The individual components of the polycarbonate resin composition of this invention must meet the specific quantitative requirements. Specifically, 0.01 to 0.1 part by weight of component (B), 0.001 to 0.01 part by weight of component (C) and 0.00001 to 0.002 part by weight, calculated as phosphorus atoms, of component (D) are used per 100 parts by weight of component (A).

Details of the operation mechanism of the components (B), (C) and (D) on the polycarbonate resin component (A) having a viscosity average molecular weight of from about 13,000 to about 18,000 have not been elucidated fully. It is presumed however that as shown in Examples and Comparative Examples given hereinafter, these components affect one another complexly to give a polycarbonate resin composition having the aforesaid excellent properties particularly suitable for optical applications. It is difficult therefore to describe in a generalized manner the functions and effects of the individual components used in the specified quantitative proportions which contribute to the properties of the polycarbonate resin composition of this invention, but their main functions and effects will be described below.

In the specific combination of components (A) to (D) in the polycarbonate resin composition of this invention, component (B) not only improves the releasability of a molded article of the composition from a mold, but also in combination with components (C) and (D), serves to produce a synergistic effect that is conducive to a further improvement in the color of the molded article. Moreover, it has been unexpectedly found that component (B) markedly improves the life and durability of a coated thin layer on the surface of a molded article of the composition in the aforesaid optical applications. If the amount of component (B) is too small outside the specified range of 0.01 to 0.1 part by weight per 100 parts by weight of component (A), the effect of improving the mold releasability is reduced and the resulting molded articles tend to develop optical distortions. Furthermore, the effect of improving the color of the molded article is greatly reduced, and it is difficult to achieve an unexpected and marked improvement in the life and durability of the thin coated layer. If the amount of component (B) is too large outside the above-specified range, silver streaks are liable to form in the molded article, and the formation of a thin coated layer on it becomes difficult.

In the combination of essential components (A) to (D) of the polycarbonate resin composition of this invention, component (C) serves to decrease the amount of component (D) which may induce the hydrolysis or pinhole formation stated hereinabove, and has a thermal stability improving action synergistically with component (D) so as to increase the thermal stability of the resin component (A) effectively. Phosphorus contained in component (C) is pentavalent phosphorus, and the component (C) intrinsically cannot be expected to have an antioxidation effect by its reducing action. Furthermore, trimethyl phosphate has a boiling point of 197° C. and triethyl phosphate has a boiling point of 215° C. It is natural to consider such compounds to be unsuitable for incorporation in a polycarbonate resin which is molded at temperatures of about 300° to 400° C. It has been found unexpectedly that component (C) cooperatively acts with component (D) in the copresence of component (B) to impart an excellent heat stabilizing effect to the polycarbonate resin composition of this invention without involving undesirable hydrolysis or pinhole formation. If the amount of component (C) is too small beyond the range of 0.001 0.01 to 0.01 part by weight per 100 parts by weight of component (A), it is difficult to obviate the coloration of the molded article, and it is impossible to overcome the difficulty of the use of component (D) which may cause hydrolysis or pinhole formation. If it is too large outside the specified range, silver streaks are liable to form in the molded article.

In the combination of the essential components (A) to (D) in the polycarbonate resin composition of this invention, the component (D), in cooperation with component (C), exhibits a hitherto unexpected and unknown action of imparting an excellent thermal stabilization effect to the polycarbonate resin composition of this invention without involving the undesirable hydrolysis or pinhole formation. If the amount of component (D) used is too small beyond the range of 0.00001 to 0.002 part by weight, calculated as phosphorus atoms, per 100 parts by weight of the component (A), the aforesaid unexpected action cannot be achieved. If it is too large beyond the specified range, the color of the molded aricle is deteriorated, and silver streaks are liable to form in the molded article. Moreover, hydrolysis or pinhole formation occurs.

The components (B) to (D) in the polycarbonate resin composition complexly affect each other and subtly contribute to the quality of the polycarbonate resin composition of this invention. Acordingly, in the practice of this invention, it is desirable to determine the suitable amounts of these components experimentally depending upon the types and combinations of these components with reference to their actions and amounts described hereinabove. It will be easily understood by those skilled in the art that after they read the present specification and know that the high quality polycarbonate composition can be provided by the specific combination of the components described herein, they can exprimentally select and determine such suitable amounts of the individual components of the composition.

In addition to the essential components (A), (B), (C) and (D) of the composition of this invention described in detail hereinabove, the composition may contain other various additives customarily used in the art. Examples of the additives are ultraviolet absorbers, coloring agents, phenolic antioxidants and fluorescent bleaching agents. The amounts of the additives may be those customarily used, and as required, those skilled in the art can easily select and determine them experimentally.

The composition of this invention can be easily prepared by mixing the essential components (A) to (D) and, if required, other additives to form a blended mixture.

The mixing may be carried out by any known method, and the sequence of mixing the components is optional. Most preferably, these ingredients are melt-mixed by an extruder. The mixing may be carried out at a temperature at which the component (A) is in the molten state, for example at about 240° to about 330° C.

Articles for use in optical applications may be produced by injection molding or injection-compression molding the polycarbonate resin composition at a resin temperature of, for example, about 300° to 400° C. mold temperature of, for example, about 70° to 120° C.

Even when the polycarbonate resin composition of this invention is molded at 300° to 400° C., it rapidly and completely fills a mold for thin-walled articles, and the molded articles can be released very smoothly from the mold, without decomposition or the occurrence of burn marks and silver streaks.

The optical articles obtained from the resin composition of this invention accurately duplicate the mold. They have a transparency represented by a light transmittance of about 90%, and are free from any optical distortion that is detrimental to practical application. Furthermore, a thin film of a metal or a metal compound formed on the surface of such a molded article, or a thin film formed thereon for preventing scratching and for antihaze and antiglare purposes, together with the polycarbonate resin substrate, has excellent wet heat resistance and can endure long-term use.

Since the polycarbonate resin composition of the invention has all the properties required of optical applications, it can be used fully for practical applications as substrates for information recording, and various lenses, prisms and Fresnel lenses.

The following Examples and Comparative Examples illustrate the present invention more specifically.

The birefringence, appearance, pinhole formation, thermal stability and hydrolysis resistance of the molded articles and the viscosity average molecular weight of the polycarbonate resin in these examples were determined or measured by the following methods

Measurement of birefringence

The birefringence of a molded plate of the composition was measured by a polarized microscope (a product of Karl-Zeiss) equipped with a compensator, and expressed in nm.

Evaluation of a molded article having a vacuum-deposited coating

A molded circular plate was put into a bell jar of a vacuum depositing device, and aluminum was vapor-deposited only on one surface of the plate at $10^{-5}$ torr. A polyurethane resin was coated on the plate, and the plate was left to stand for 72 hours in a constant-temperature constant-humidity machine in an atmosphere kept at a relative humidity of 95% and a temperature of 85° C. Then, the number of pinholes was counted. Pinholes are undesirable since they prevent accurate recording of information.

Appearance

Visually observed during and after the molding. The appearance was rated "good" when the mold releasability was good and there was no burn mark, silver streak nor coloration.

Evaluation of thermal stability

A sample plate, 2 mm thick, 50 mm wide and 70 mm long, was produced by injection molding of pellets in a 3-ounce injection molding machine (made by The Japan Steel Works, Ltd.) at a resin temperature of 380° C. To test its heat stability, the sample plate was caused to reside for 10 minutes in the cylinder of the molding machine. Then, the color of the sample plate and the color of another sample plate without the aforesaid residence in the cylinder were measured by a color difference meter (made by Color Machine Company). The color was expressed by b value. The smaller the b value, the lower the degree of coloration.

Evaluation of hydrolysis resistance

The sample plate obtained without residence in regard to the evaluation of thermal stability was treated in a steam sterilizer at 120° C. for 11 hours, and then the viscosity average molecular weight of the treated sample plate was measured.

Determination of viscosity average molecular weight

The resin (0.7 g) was dissolved in 100 ml of methylene chloride and the specific viscosity $\eta_{sp}$ of the solution was measured at 20° C. by an Ostwald viscometer. The viscosity average molecular weight $\overline{M}$ was calculated from the following expression.

$$\eta_{sp}/0.7=[\eta]+0.45\times 0.7\times [\eta]^2$$

$$[\eta]=1.23\times 10^{-4}\overline{M}^{0.83}$$

EXAMPLES 1-9 and COMPARATIVE EXAMPLES 1-10

An alkaline aqueous solution of bisphenol A and methylene chloride were stirred at 25° C., and phosgene was introduced. Then, a molecular weight controller and triethylamine were added, and the reaction was carried out for about 3 hours. The methylene chloride layer of the reaction mixture was repeatedly washed with water. The solvent was removed, and the slurry-like polycarbonate was dried under reduced pressure at 110° C. for 4 hours to give a polycarbonate powder having an average molecular weight of 15,000.

One hundred parts by weight of the polycarbonate powder were mixed with the additives indicated in Table 1, and the mixture was extruded at a temperature of 250° to 270° C. using a 30 mm extruder. The extruded thread was pelletized by a cutter. The pellets were molded by an injection molding machine (Neomat 150/75, made by Sumitomo Heavy Machinery Industry Co., Ltd.) at a resin temperature of 350° C. and a mold temperature of 90° C. to produce a circular plate having a diameter of 155 mm and a thickness of 2.0 mm. The plate was evaluated by the methods described hereinabove. The birefringence of the plate was measured at a position 45 mm away circumferentially from the center of the circular plate. The results are shown in Table 1.

TABLE 1

| | Component (B) | | Component (C) | | Component (D) | | |
|---|---|---|---|---|---|---|---|
| | Type | Parts by weight | Type | Parts by weight | Type | Parts by weight | Parts by weight of phosphorus |
| Example | | | | | | | |
| 1 | B1 | 0.03 | trimethyl phosphate | 0.004 | D1 | 0.001 | 0.0001 |
| 2 | " | 0.04 | trimethyl phosphate | 0.005 | D2 | 0.005 | 0.0002 |
| 3 | " | 0.04 | trimethyl phosphate | 0.010 | " | 0.005 | 0.0002 |
| 4 | " | 0.05 | trimethyl phosphate | 0.006 | D1 | 0.004 | 0.0004 |
| 5 | " | 0.04 | trimethyl phosphate | 0.005 | " | 0.010 | 0.0010 |
| 6 | " | 0.04 | trimethyl phosphate | 0.005 | " | 0.020 | 0.0020 |
| 7 | " | 0.04 | trimethyl phosphate | 0.005 | D2 | 0.030 | 0.0013 |
| 8 | B2 | 0.05 | trimethyl phosphate | 0.005 | " | 0.010 | 0.0004 |

TABLE 1-continued

| | | | | | | | |
|---|---|---|---|---|---|---|---|
| 9 | " | 0.04 | trimethyl phosphate | 0.005 | " | 0.030 | 0.0013 |
| Comparative Example | | | | | | | |
| 1 | B1 | 0.001 | trimethyl phosphate | 0.005 | D2 | 0.030 | 0.0013 |
| 2 | " | 0.50 | trimethyl phosphate | 0.005 | " | 0.030 | 0.0013 |
| 3 | " | 0.04 | trimethyl phosphate | — | " | 0.030 | 0.0013 |
| 4 | " | 0.04 | trimethyl phosphate | 0.050 | " | 0.030 | 0.0013 |
| 5 | " | 0.04 | trimethyl phosphate | 0.005 | " | — | — |
| 6 | " | 0.04 | trimethyl phosphate | 0.001 | " | 0.050 | 0.0022 |
| 7 | " | 0.04 | trimethyl phosphate | 0.005 | " | 0.300 | 0.0130 |
| 8 | " | 0.04 | trimethyl phosphate | — | " | 0.053 | 0.0024 |
| 9 | " | 0.04 | trimethyl phosphate | 0.011 | — | — | — |
| 10 | " | 0.04 | trimethyl phosphate | — | — | — | — |

| | Circular plate | | Number of pinholes of the circular vacuum deposited coating | | Thermal stability (b value) | | Hydrolysis resistance (M) |
|---|---|---|---|---|---|---|---|
| | Birefringence (nm) | Appearance | Before treatment | After treatment | No residence | After residence | |
| Example | | | | | | | |
| 1 | 78 | Good | 0 | 0 | 3.3 | 4.5 | 14,800 |
| 2 | 52 | " | 0 | 0 | 3.7 | 4.5 | 14,700 |
| 3 | 67 | " | 0 | 0 | 3.6 | 4.3 | 14,700 |
| 4 | 56 | " | 0 | 0 | 3.6 | 4.2 | 14,600 |
| 5 | 64 | " | 0 | 0 | 3.5 | 4.1 | 14,500 |
| 6 | 53 | " | 0 | 0 | 3.3 | 3.7 | 14,100 |
| 7 | 41 | " | 0 | 0 | 3.5 | 4.0 | 14,400 |
| 8 | 45 | " | 0 | 0 | 3.7 | 4.4 | 14,600 |
| 9 | 53 | " | 0 | 0 | 3.5 | 4.0 | 14,300 |
| Comparative Example | | | | | | | |
| 1 | 153 | Poor releasability | 0 | 23 | 4.0 | 5.0 | 14,400 |
| 2 | — | Silver streaks formed, surface had a tacky feel | — | — | — | — | — |
| 3 | — | Yellowish | 0 | 0 | 4.4 | 5.6 | 14,300 |
| 4 | — | Silver streaks formed | — | — | — | — | — |
| 5 | — | Burn marks occured | — | — | — | — | — |
| 6 | 58 | Good | 0 | 7 | 3.5 | 3.9 | 13,800 |
| 7 | — | Blackish | 0 | 45 | — | — | — |
| 8 | 56 | Good | 0 | 12 | 3.6 | 4.1 | 13,500 |
| 9 | — | Orangish | 0 | 0 | 5.2 | 7.2 | 14,500 |
| 10 | — | Burn marks occured | — | — | — | — | — |

Note
B1: Resistat AF-101 (tradename, Daiichi Kogyo Seiyaku K. K.; containing a partial ester of $C_{18}$-$C_{22}$ monobasic fatty acids and glycerol as a main component)
B2: Rickemal S-100A (tradename, Riken Vitamin Co., Ltd.; containing a stearyl monoglyceride as a main component)
D1: triphenyl phosphite
D2: tris(mixed mono/di-nonylphenyl)phosphite

EXAMPLES 10–14

The pellets used in Examples 1 and 4 to 7 were respectively molded by an injection molding machine (Neomat 1575/300, made by Sumitomo Heavy Machinery Industrial Co., Ltd.) at a resin temperature of 360° C. and a mold temperature of 120° C. to produce a circular plate having a diameter of 300 mm and a thickness of 1.2 mm. The plate was evaluated by the methods descriped above. The birefringence was measured at positons 65, 85, 105, 125, and 145 mm, respectively, away circumferentially from the center of the circular plate. The results are shown in Table 2.

TABLE 2

| | Component (B) | | Component (C) | | Component (D) | | | Circular plate | | | | | |
|---|---|---|---|---|---|---|---|---|---|---|---|---|---|
| | | | | | | | Parts by weight of phosphorus | Birefringence (nm) | | | | | |
| Example | Type | Parts by weight | Type | Parts by weight | Type | Parts by weight | | 65 mm | 85 mm | 105 mm | 125 mm | 145 mm | Appearance |
| 10 | B1 | 0.03 | Trimethyl phosphate | 0.004 | D1 | 0.001 | 0.0001 | 38 | 25 | 21 | 19 | 52 | Good |
| 11 | " | 0.05 | Trimethyl phosphate | 0.006 | " | 0.004 | 0.0004 | 21 | 17 | 18 | 16 | 43 | " |
| 12 | " | 0.04 | Trimethyl | 0.005 | " | 0.01 | 0.001 | 19 | 15 | 17 | 11 | 39 | " |

TABLE 2-continued

| Example | Component (B) Type | Component (B) Parts by weight | Component (C) Type | Component (C) Parts by weight | Component (D) Type | Component (D) Parts by weight | Parts by weight of phosphorus | Circular plate Birefringence (nm) 65 mm | 85 mm | 105 mm | 125 mm | 145 mm | Appearance |
|---|---|---|---|---|---|---|---|---|---|---|---|---|---|
| 13 | " | 0.04 | Trimethyl phosphate | 0.005 | " | 0.02 | 0.002 | 13 | 10 | 11 | 9 | 23 | " |
| 14 | " | 0.04 | Trimethyl phosphate | 0.005 | D2 | 0.03 | 0.0013 | 10 | 9 | 10 | 7 | 18 | " |

What is claimed is:

1. A polycarbonate resin composition comprising a blended mixture of
   (A) 100 parts by weight of a polycarbonate resin having a viscosity average molecular weight of from about 13,000 to about 18,000,
   (B) 0.01 to 0.1 part by weight of a partial ester of a monobasic fatty acid having 10 to 22 carbon atoms with a polyhydric alcohol having 2 to 10 carbon atoms,
   (C) 0.001 to 0.01 part by weight of trimethyl phosphate, and
   (D) 0.00001 to 0.002 part by weight, calculated as phosphorus atoms, of a phosphite ester having 9 to 60 carbon atoms.

2. The composition of claim 1 wherein the polycarbonate resin (A) is a polycarbonate resin derived from a bis(hydroxyphenyl)alkane and a carbonate precursor.

3. The composition of claim 2 wherein the bis(hydroxyphenyl)alkane is at least one member selected from the group consisting of 2,2-bis(4-hydroxyphenyl)-propane, 1,1-bis(4-hydroxyphenyl)ethane and 2,2-bis(4-hydroxyphenyl)hexafluoropropane.

4. The composition of claim 2 wherein the carbonate precursor is at least one member selected from the group consisting of phosgene and diphenyl carbonate.

5. The composition of claim 1 wherein the partial ester (B) is a partial ester derived from at least one monobasic fatty acid having 10 to 22 carbon atoms selected from the group consisting of myristic acid, palmitic acid, stearic acid, oleic acid and fatty acids of hardened fish oils and at least one polyhydric alcohol having 2 to 10 carbon atoms selected from the group consisting of ethylene glycol, glycerol and pentaerythritol.

6. The composition of claim 1 wherein the phosphite ester (D) is a phosphite tri-ester.

7. The composition of claim 6 wherein the phosphite tri-ester is at least one member selected from the group consisting of triphenyl phosphite, tris(nonylphenyl) phosphite, 2-ethylhexyl diphenyl phosphite and tris(2,4-di-tert-butylphenyl) phosphite.

* * * * *